(12) United States Patent
Trevino et al.

(10) Patent No.: US 10,310,091 B2
(45) Date of Patent: Jun. 4, 2019

(54) GPS-BASED TIME STAMP SYSTEM

(71) Applicant: Southwest Research Institute, San Antonio, TX (US)

(72) Inventors: Gerardo Trevino, San Antonio, TX (US); Ben A. Abbott, San Antonio, TX (US)

(73) Assignee: SOUTHWEST RESEARCH INSTITUTE, San Antonio, TX (US)

(\*) Notice: Subject to any disclaimer, the term of this patent is extended or adjusted under 35 U.S.C. 154(b) by 107 days.

(21) Appl. No.: 14/611,184

(22) Filed: Jan. 31, 2015

(65) Prior Publication Data

US 2016/0223677 A1 Aug. 4, 2016

(51) Int. Cl.
*H04K 3/00* (2006.01)
*G01S 19/21* (2010.01)

(52) U.S. Cl.
CPC .............. *G01S 19/215* (2013.01); *H04K 3/90* (2013.01)

(58) Field of Classification Search
CPC ........ G01S 19/215; G01S 19/13; G01S 19/20; G01S 19/23; G01S 19/235; G01S 19/243; G01S 19/14; H04K 3/90; H04J 3/0688; H04J 3/0661; G06F 1/14; H04W 56/0015; G04G 7/00; G01V 1/22; G01V 1/24; G04F 5/145; H04N 21/242
USPC .................................................... 342/357.59
See application file for complete search history.

(56) References Cited

U.S. PATENT DOCUMENTS

| | | | |
|---|---|---|---|
| 5,666,330 A * | 9/1997 | Zampetti | G04G 7/02 368/47 |
| 5,798,732 A * | 8/1998 | Eshenbach | G01S 19/243 342/352 |
| 6,169,753 B1 * | 1/2001 | Yoshida | H04J 3/0688 370/507 |
| 6,199,170 B1 * | 3/2001 | Dietrich | G06F 1/14 713/400 |
| 6,748,202 B2 * | 6/2004 | Syrjarinne | H04W 64/00 342/357.64 |
| 7,142,154 B2 * | 11/2006 | Quilter | G04G 7/00 342/357.31 |
| 7,558,157 B1 * | 7/2009 | Gardner | G01V 1/22 367/76 |
| 8,299,858 B2 * | 10/2012 | Gan | G04F 5/145 331/3 |
| 8,605,543 B2 * | 12/2013 | Ray | G01V 1/24 367/51 |
| 8,938,636 B1 * | 1/2015 | Hochschild | H04J 3/0661 713/401 |
| 9,219,938 B2 * | 12/2015 | Snow | H04N 21/4305 |

(Continued)

*Primary Examiner* — Bernarr E Gregory
*Assistant Examiner* — Nuzhat Pervin
(74) *Attorney, Agent, or Firm* — Livingston Law Firm

(57) ABSTRACT

A system and method for providing time stamps protected from GPS timing signal attacks. A GPS receiver receives a GPS time data, and a local clock provides local time data. A controller initiates the local clock with the GPS time data. It continuously monitors the GPS time data by calculating any difference error between current GPS time data and local time data, and determining whether the error exceeds a threshold value. If the error does not exceed the threshold value, the GPS time data is used to discipline the local clock data and the disciplined output is used for the time stamp. If the error exceeds the threshold value, the local time data is used for the time stamp.

10 Claims, 3 Drawing Sheets

(56) References Cited

U.S. PATENT DOCUMENTS

| | | | | |
|---|---|---|---|---|
| 9,261,599 B1* | 2/2016 | Golden | ................ | G01S 19/256 |
| 9,348,321 B2* | 5/2016 | Dougan | ................ | G04G 7/00 |
| 9,520,860 B2* | 12/2016 | Whitehead | ................ | G06F 1/14 |
| 9,541,649 B2* | 1/2017 | Leibner | ................ | H04L 63/1483 |
| 2010/0158051 A1* | 6/2010 | Hadzic | ................ | H03L 7/085 |
| | | | | 370/503 |

* cited by examiner

GPS-BASED TIME STAMP SYSTEM

TECHNICAL FIELD OF THE INVENTION

This invention relates to providing precision time stamps for data acquisition systems and various other equipment.

BACKGROUND OF THE INVENTION

The Global Positioning System (GPS) is a space-based satellite navigation system that provides location and time information to anywhere on Earth where there is a line of sight to four or more GPS satellites. GPS provides critical capabilities to military, civil and commercial users around the world. It is maintained by the United States government and is freely accessible to anyone with a GPS receiver.

GPS has non navigation as well as navigation applications. In typical GPS operation as a navigator, four or more satellites must be visible to obtain an accurate result. The solution of the navigation equations gives the position of the receiver along with the difference between the time kept by the receiver's on-board clock and the true time-of-day, thereby eliminating the need for a receiver-based clock.

Applications for GPS such as time transfer, traffic signal timing, and synchronization of various distributed equipment, make use of this accurate timing. An example of a system having distributed units that uses GPS time synchronization is a cell phone system and its cell phone base stations. For time synchronization applications, it is claimed the accuracy of GPS time signals (±10 ns) is second only to the atomic clocks upon which they are based.

GPS is vulnerable to "spoofing", defined as the transmission of false GPS signals that GPS receivers accept as authentic ones. At its worst, GPS spoofing could allow hackers to disrupt or even to gain control over equipment that rely on GPS for navigation or timing.

Advances are being made into countermeasures to make GPS navigation and timing applications less vulnerable to spoofing and other types of attacks. Of particular threat to timing applications, GPS is vulnerable to timing attacks that are not detectable with current technology.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a GPS-based time validation unit that provides precise time stamp data, that is, data representing the current time of an event as recorded. Threshold-timing differences are detected to prevent the manipulation of time stamps. The time stamps remain synchronized to an external reference clock source (GPS).

More specifically and as explained in further detail below, the time validation unit has both a receiver for a GPS timing signal and a high-quality local clock. The local clock is initially seeded with the GPS timing signal and disciplined with the GPS timing signal insofar as the GPS timing signal is deemed trustworthy. Timing differences between the two time sources (GPS and local) are compared. A time difference above a threshold indicates that the GPS timing signal is suspect with regard to spoofing or other attacks. In this event, the local clock output provides precision timing.

An example of an application of the time validation unit is for data acquisition equipment. Many data acquisition devices use GPS timing signals as a basis for synchronizing among themselves. The result is GPS-based timing synchronization for a system of cooperative distributed units.

For purposes of example in this description, the time validation unit is used in connection with data acquisition devices known as phasor measurement units (PMUs). PMUs measure electrical waves on the electrical power grid, and thereby help manage and improve power systems.

However, it should be understood that many other types of GPS timing signal receivers are subject to timing attacks. The time validation unit described herein can be used for any equipment using GPS-based time stamps.

Figure 1:
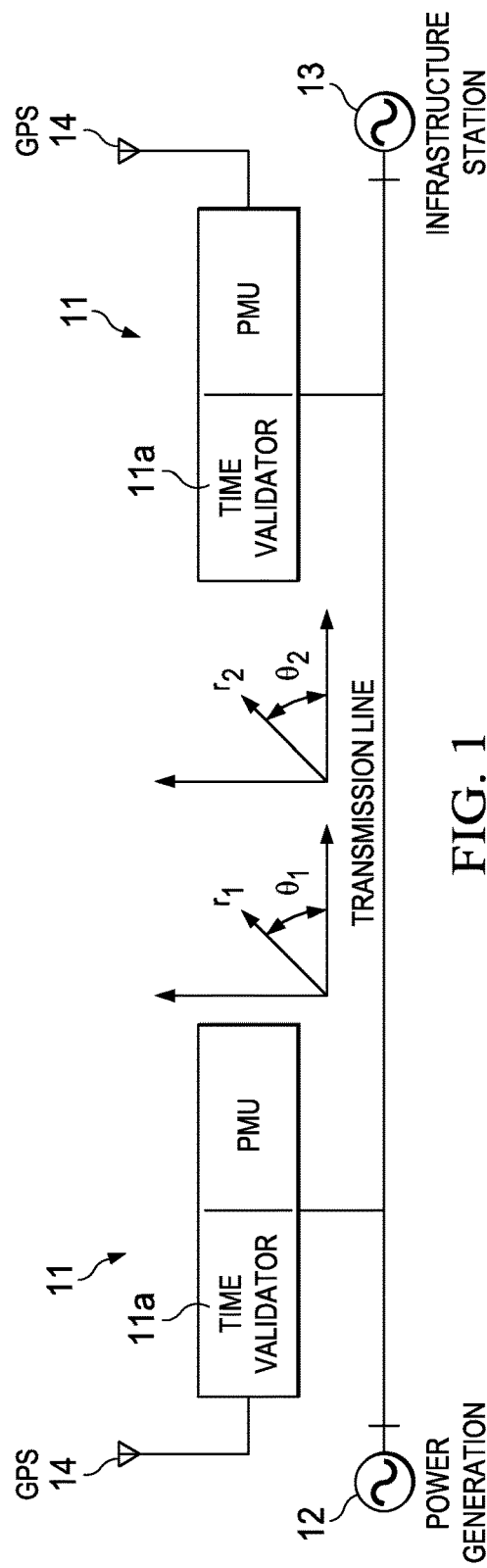
FIG. 1 illustrates a system of data acquisition units, each having a GPS-based time validation unit in accordance with the invention.

FIG. 1 illustrates two PMUs 11, in use to measure the synchrophasor angle difference between a power generation unit 12 and an infrastructure station 13. In practice, an electrical power system has a vast number of distributed PMUs 11. The PMUs 11 provide accurate synchronized phasor (representation of a sinusoidal function) measurements (synchrophasors) from across the power system, enabling decision-making capabilities to help improve system reliability. PMUs 11 collect data from substations, such as station 13, and from other locations within the grid to evaluate the grid's behavior. PMUs have been used recently to manage the Bulk Electric System (BES) consisting of generators, substations, and 100 kV and higher voltage transmission lines.

PMUs 11 share a GPS time source, represented by receiving antenna 14. PMU time synchronization is critical to the correct operation and maintenance of the above-described grid operations. For example, PMU measurement data may be fed back to a control center with various transmission delays. To obtain an accurate system operation status, the control center must align all collected measurements in the time domain, i.e., the data must be time synchronized. Typically, lock synchronization accuracies on the order of a few microseconds are necessary for proper management functionality.

More specifically, as an example of operation of the PMUs 11, each PMU 11 periodically samples grid operation state parameters, such as frequency and voltage. The sampling is triggered by the GPS timing signal from the GPS receiver. To cope with different data transmission delays of different measurements, it is necessary to attach the time values at which the measurements are sampled. This procedure is similar to posting a stamp to the measurements (hence called time stamp). The control center receives the collected measurements, aligns them according to their time stamps, and analyzes the system state for future control actions. By applying GPS timing as the grid-wide sampling reference time, all PMUs sample in a synchronous manner.

Conventional PMUs are vulnerable to various GPS attack scenarios. Examples of attack scenarios are jamming, fast spoofing, slow spoofing, jitter, and clock start and stop. These attacks are collectively referred to herein as "time synchronization attacks".

To detect such attacks and to preserve time stamp integrity in accordance with the invention, each PMU 11 is equipped with a time validation unit 11a. As further explained below, time validation unit 11a has both a receiver for GPS signals and a local clock. It compares differences between these two time sources to verify the integrity of the GPS timing data. It uses its local clock during signal verification, and if the GPS signal is true, it corrects ("disciplines") the local clock to match the GPS timing data. It then provides a clock output for timestamping. In this manner, time validation unit 11a prevents manipulation of the time stamps.

Figure 2:
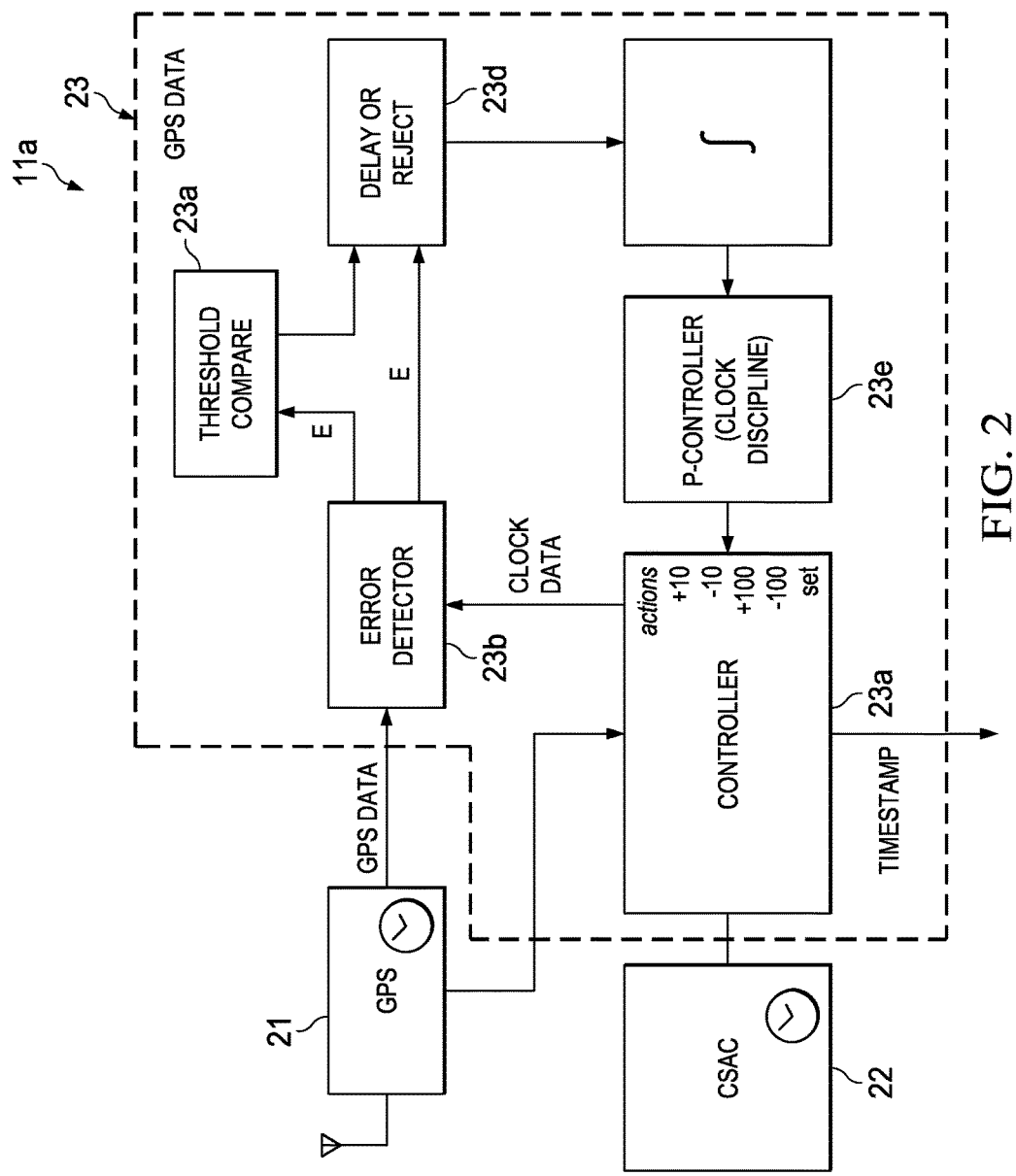
FIG. 2 illustrates one embodiment of the time validation unit of FIG. 1.

FIG. 2 is a block diagram of time validation unit 11a. Its main elements are a GPS receiver 21, a local clock 22 and a timing controller 23.

GPS receiver 21 receives a GPS signal, which contains conventional GPS timing data. GPS receiver 21 has whatever hardware or software is required to receive GPS signals and to interpret those signals to acquire GPS timing data.

A local clock 22 provides local timing data. An example of a suitable local clock 22 is a chip scale atomic clock (CSAC). Commercially available CSAC's provide microsecond precision timing. Various other types of local precision clocks may be used. Local clock 22 may be implemented with various types of crystal oscillators with appropriate hardware and/or software for being initially seeded with GPS time and providing a local time output. Various integrated or discrete circuits are available for this purpose.

Timing controller 23 implements various timing verification processes. Although validation unit 11a uses a GPS signal, a feature of validation unit 11a is that there is no assumption that the GPS signal is valid. The local timing data from local clock 22 is used as a "truth source" if the GPS timing data has been attacked or is otherwise untrustworthy. This approach is different from conventional disciplined local oscillator approaches of stabilizing GPS clocks. Conventional disciplined local oscillators assume that the time acquired through the GPS signal is correct. In contrast, the method applied by validation unit 11a assumes the GPS signal cannot always be trusted, and only trusts it at local clock initialization. After that, the local clock 22 is used as a truth clock to determine if the GPS signal is under attack. If a GPS attack is detected, the GPS signal is not considered as truthful and is not used.

In this manner, timing controller 23 uses either the locally disciplined GPS time or the local clock time to generate time stamp data. In other words, if the GPS time is not deemed trustworthy, a local trusted time source is used. If the GPS time is trusted, it is used and disciplines the local clock.

It is assumed that timing controller 23 has appropriate software or hardware for performing these tasks. Various process elements of FIG. 2 are shown as discrete processes. However, it is a design choice how these tasks are distributed among various software and hardware processing or logic devices, and/or integrated into a single processor-based controller.

Figure 3:
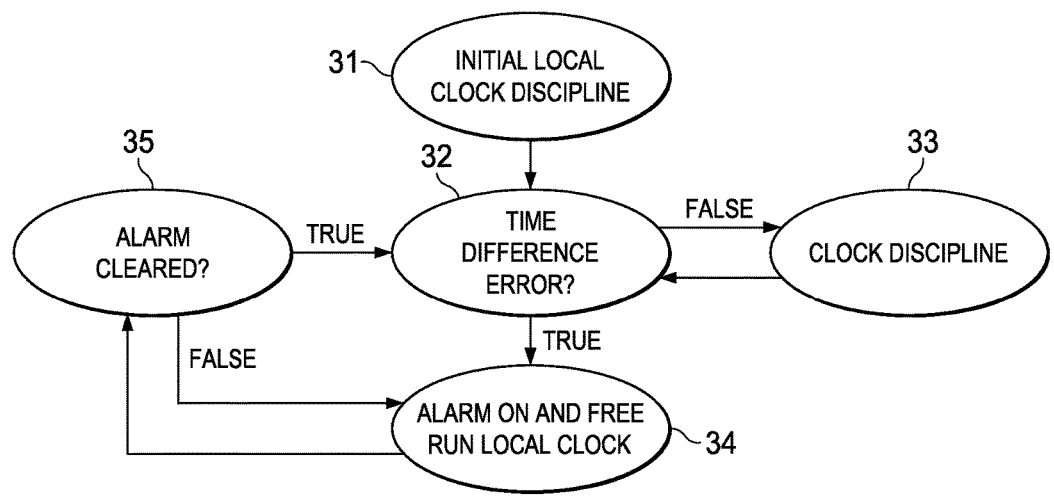
FIG. 3 illustrates the time validation process.

FIG. 3 illustrates the tasks performed by timing controller 23. It should be understood that this monitoring, verifying and local clock disciplining process is performed on a repeated and continuous basis.

Referring to both FIGS. 2 and 3, a main controller 23a receives the local clock signal from local clock 22. It performs an initial local clock discipline process, which disciplines the local clock output so that it complies with the GPS timing data. Thus, the GPS timing data is initially trusted and used to initiate the local timing data. This process is illustrated as Step 31 in FIG. 3.

An error detector 23a receives both the GPS timing data from and the local clock data. It compares the GPS timing data to the local clock data, to determine a current timing difference (error) value.

A threshold comparator 23c determines whether the time difference exceeds a predetermined and stored threshold value. The threshold value may vary, but an example of a suitable threshold value is 100 nanoseconds. In other words, if the time difference between the GPS timing data and the local clock data is greater than 100 nanoseconds, the error exceeds the threshold. In general, the difference threshold is chosen to be a time difference that exceeds a "reasonable" drift, with "reasonable" depending on factors such as the equipment and the application.

If the timing error exceeds the threshold, that information is sent to a delay/reject process 23d. Process 23d uses the time from the past; it looks from previous positions thus allowing it to detect a GPS attack before it determines whether to accept the GPS time to discipline the local clock 22. It is a decision step whether to use the time that is coming from the GPS signal or to use the time from the local clock for the time stamp.

The processes performed by error detector 23b, threshold comparator 23c and delay/reject process 23d are represented as Step 32 of FIG. 3.

A proportional integral (PI) controller 23e is used to discipline the time of the local clock 22. Proportional integral (PI) controller 23e sets its output in proportion to the error (proportional) and the magnitude of the error and the duration of the error (integral).

In the case where GPS time is accepted, the local time is proportionally adjusted based on the GPS time. This step is illustrated as Step 33 of FIG. 3. As explained above, this disciplined time is used for a time stamp, which may then be stored along with whatever associated data being recorded and/or transmitted to a central station.

In the case GPS time has been rejected by delay/reject process 23d, the time adjustment stays at the most recent adjustment value provided by the proportional integral (PI) controller 23e. This step is illustrated by Step 34 of FIG. 3.

Additionally, if GPS time has been rejected, main controller 23a generates an alarm signal and continues to monitor the timing signals until the alarm is cleared. Until the alarm is cleared, the local clock 22 continues to be used as the time source. This process is indicated in Step 35 of FIG. 3. Once the alarm is cleared, the main controller 23a may then re-initiate the local clock with the GPS signal.

During an alarm condition, the local clock 22 provides precision timing for a sufficiently long duration to allow for verification of the quality of the GPS timing data, prior to using it for updates in the disciplining procedure. It is this time data that is used for time stamps.

Main controller 23a may be further programmed to determine not only that an attack is ongoing but also the type of GPS attack. Various types of attacks to be identified are spoofing, jamming, jitter, stop and start, or other types of attacks.

Experimentation has indicated that time validation unit 11a is at least capable of detecting any deviation between the GPS signal and the local clock signal to within 25 nanoseconds.

What is claimed is:

1. A time stamp validation system, comprising:
 a GPS receiver operable to receive a GPS time signal representing GPS time data;
 a local clock operable to provide local time data;

wherein the local clock is initialized by, and disciplined by, the GPS time signal to provide time stamp data, unless a compromise of the GPS signal is detected;

an error detector operable to determine a current time difference between the GPS time data and the local time data, thereby determining an error value;

a threshold comparator operable to determine if the time difference exceeds a predetermined threshold;

a delay and reject process operable to determine whether the GPS time data is to be accepted;

wherein the delay and reject process operates on past GPS time data and past local time data;

a proportional integral (PI) controller operable to output discipline values to discipline the local clock in either of two ways: if the GPS time is accepted, to provide a current discipline value based on the error value, or if the GPS time is not accepted, to provide a prior discipline value based on the most recent prior output of the PI controller; and a main controller operable to generate time stamps, using current discipline values if the GPS time is accepted, and if the GPS time is not accepted, using the same prior discipline value without reference to any external time source until the GPS time is verified;

wherein the delay and reject process operates on past GPS time data and past local time data, such that main controller applies discipline values to current local time data.

2. The system of claim 1, wherein the local clock is an integrated local clock circuit.

3. The system of claim 2, wherein the local clock is a chip scale atomic clock.

4. The system of claim 1, wherein the controller is programmed to detect whether the error data represents a GPS time synchronization attack.

5. The system of claim 1, wherein the threshold value is 100 nanoseconds or more.

6. A method of providing time stamps, comprising:
receiving a GPS time signal representing GPS time data;
providing local time data with a local clock;
initiating the local clock with the GPS time data;
calculating any difference between current GPS time data and local time data, thereby obtaining a current error value;
determining whether the current error value exceeds a threshold value;
delivering the current error value to a proportional integral (PI) controller;
using the PI controller to calculate a discipline value;
if the error data does not exceed the threshold value, disciplining the local clock data with a current discipline value and using that disciplined output for a time stamp; and
if the error data exceeds the threshold value, disciplining the local clock with the most recent adjustment provided by the PI controller, and using that disciplined value for to adjust the local clock, thereby using the local clock as the time source for time stamps rather than any external time source until the GPS time data is verified.

7. The method of claim 6, wherein the local clock is an integrated local clock circuit.

8. The method of claim 7, wherein the local clock is a chip scale atomic clock.

9. The method of claim 6, wherein the controller is programmed to detect whether the error data represents a GPS time synchronization attack.

10. The method of claim 6, wherein the threshold value is 100 nanoseconds or more.

* * * * *